US006908003B2

United States Patent
Feyes et al.

(10) Patent No.: US 6,908,003 B2
(45) Date of Patent: Jun. 21, 2005

(54) AIR TIGHT ELECTRICAL BOX

(75) Inventors: Andrew M. Feyes, Bryan, OH (US); Mark A. Troder, Butler, IN (US)

(73) Assignee: Allied Moulded Products, Inc., Bryan, OH (US)

( * ) Notice: Subject to any disclaimer, the term of this patent is extended or adjusted under 35 U.S.C. 154(b) by 0 days.

(21) Appl. No.: 10/809,730

(22) Filed: Mar. 25, 2004

(65) Prior Publication Data

US 2004/0182857 A1 Sep. 23, 2004

Related U.S. Application Data

(63) Continuation of application No. 09/721,199, filed on Nov. 22, 2000, now abandoned.

(51) Int. Cl.[7] ................................. H02G 3/08
(52) U.S. Cl. ......................... 220/3.2; 174/53
(58) Field of Search .................. 220/3.2–3.8; 174/53, 174/58

(56) References Cited

U.S. PATENT DOCUMENTS

| | | | |
|---|---|---|---|
| 2,426,800 A | 9/1947 | Triplett | |
| 3,684,819 A | 8/1972 | Wilson | |
| 4,296,870 A | 10/1981 | Balkwill et al. | |
| 4,616,104 A | 10/1986 | Lindsey | |
| 4,667,840 A | 5/1987 | Lindsey | |
| 4,673,097 A | 6/1987 | Schuldt | |
| 4,724,281 A * | 2/1988 | Nix et al. | 174/53 |
| 4,952,754 A * | 8/1990 | Rye | 174/53 |
| 5,144,099 A | 9/1992 | Cardy | |
| 5,287,665 A | 2/1994 | Rath, Jr. | |
| 5,677,512 A | 10/1997 | Reiker | |
| 5,804,764 A | 9/1998 | Gretz | |
| 6,051,786 A | 4/2000 | Gretz | |
| 6,239,365 B1 | 5/2001 | McEvers | |
| 6,278,059 B1 | 8/2001 | Lefton | |
| 6,395,984 B1 * | 5/2002 | Gilleran | 174/58 |
| 6,586,679 B2 * | 7/2003 | Bashford | 174/58 |

* cited by examiner

Primary Examiner—Joseph C. Merek
(74) Attorney, Agent, or Firm—Fraser Martin Buchanan Miller LLC; James D. Miller

(57) ABSTRACT

A new an improved electrical utility box and flush mounted device box having a flange extending from the box in all directions and a method of adhesively securing the flange to existing boxes. The flange has an upwardly facing surface and a downwardly facing surface which are planar and generally parallel to the bottom of the box. The flange is self supporting and yet flexible enough to accommodate the dimensional and alignment irregularities in construction.

9 Claims, 3 Drawing Sheets

AIR TIGHT ELECTRICAL BOX

CROSS-REFERENCE TO RELATED APPLICATION

This application is a continuation application of U.S. patent application Ser. No. 09/721,199, filed Nov. 22, 2000 now abandoned, hereby incorporated herein by reference.

FIELD OF THE INVENTION

The present invention relates to electrical boxes and flush mounted device boxes such as currently used for mounting electrical devices in walls, floors and ceilings, and more particularly to a new and improved electrical outlet box and flush mounted device box which allows one to maintain the integrity of a vapor barrier in building construction.

BACKGROUND OF THE INVENTION

Electrical boxes have long been required by the National Electrical Code to be used in building construction for enclosing electrical apparatus such as switches, sockets and electrical appliance connections. An electrical outlet box is generally secured to the studs or joists in a wall or ceiling or floor construction with an open top or face extending into the room. Flush mount device boxes are generally secured flush to the outside sheeting to be surrounded by exterior siding and to be enclosed by the mounting of an electrical device in the box.

Whenever an electrical outlet box or a flush mounted device box is utilized, the vapor barrier provided by the wall construction to exclude cold winter air entering into the house has to be at least in part penetrated by the mounting of such boxes. Therefore it is highly desirable to provide a new and improved outlet box or flush mounted device box which allows such boxes to be installed in a wall construction and yet maintain the integrity of the vapor barrier of the wall construction.

One method proposed to provide a vapor barrier in all of the external walls and ceilings of a building is to lay a continuous plastic sheet either between the studs and the siding or between the studs and the drywall to form a totally encompassing vapor barrier around the building to prevent any air from leaking into the building and any air from within the building to leak out of the building. The use of both electrical outlet boxes and flush mounted device boxes require the penetration of this vapor seal. Heretofore, it has been extremely difficult to provide a seal between the electrical outlet boxes and flush mounted device boxes to maintain the integrity of a vapor barrier. Therefore it is highly desirable to provide a new and improved electrical outlet box which can provide a seal with the vapor barrier of an exterior wall or ceiling to maintain the integrity of the vapor barrier. It is also highly desirable to provide a new and improved flush mounted device box which can provide a seal with the vapor barrier of an exterior wall or ceiling to maintain the integrity of the vapor barrier.

Concurrent with the development of the new and improved electrical outlet box and flush mounted device box of the invention, others have proposed utilizing a rigid flange surrounding the electrical outlet box or flush mounted device box so as to extend outwardly of the box in all directions and to have upper and lower surfaces which are generally parallel with the bottom surface of the box to overlay the vapor barrier. No one has provided any such flange on conventional metal boxes nor on other material boxes. However, others have concurrently with the development of the invention provided a molded PVC box having a flange of the type above described integrally molded with the sides and bottom of the electrical box. It is therefore highly desirable to provide a flange on all electrical outlet boxes and flush mounted device boxes which extends outwardly of the box and has upwardly facing and downwardly facing planar surfaces which are generally parallel to the bottom of the box.

Inasmuch as the walls and sides of electrical outlet boxes and flush mounted device boxes are required to be essentially rigid, any integrally molded flange has essentially the same rigidity as the sides of the box. Such rigidity gives to contractors installing the box several problems. In any wall construction, imperfections in the studs and the construction of the wall require each of the elements of the wall construction to accommodate small differences in tolerance measurements and alignment. While a flexible vapor barrier easily accommodates such imperfections, a rigid flange extending outwardly of an electric outlet box or flush mounted device box does not. Thus, rigid flanges have been known to cause ripples in interior wall construction and exterior siding installation. To alleviate these ripples, hand labor in shaving or adjusting the position of studs are required to maintain the desired appearance of both siding and interior wall surfaces. It is therefore highly desirable to provide a new and improved electrical outlet box and flush mounted device box which not only can be mounted in a manner to maintain the integrity of a vapor barrier in an exterior wall or ceiling of a building but which also accommodates any small inconsistencies in dimensions, alignment and the like allowing for fast and efficient construction and at the same time maintaining planar interior wall surfaces and desired siding construction.

Surprisingly in accordance with the invention, a flexible flange secured to an electrical outlet boxes and flush mounted device boxes meet all of the above requirements. However, flexible flanges are difficult to install and seal exterior wall vapor barriers and the adherence of such flanges to boxes of various different materials has been proven more difficult than anticipated. Thus, it is highly desirable to provide a new and improved electrical outlet box and flush mounted device box having a flexible flange with upwardly facing and downwardly facing planar surfaces generally parallel to the box bottom which can be easily secured to the vapor barrier in exterior walls of a building to maintain the integrity thereof.

It is also desirable to provide a new and improved electrical outlet box and flush mounted device box which has a flange extending outwardly of the box in all directions with upwardly facing and downwardly facing planar surface generally parallel to the bottom of the box which is self supporting and yet flexible.

It is also desirable to provide a new and improved electrical outlet box and flush mounted device box having a flange extending outwardly thereof in all directions having top and bottom planar surfaces generally parallel with the bottom in which the flange is made of a plastic material adhesively secured to the box in a manner whereby the securance once made is maintained throughout the use of the box in the life of the building to which it is attached.

It is also desirable to provide a new and improved method by which a flexible yet self supporting vapor barrier flange may be secured to existing electrical outlet boxes and flush mounted device boxes adhesively in a manner whereby the integrity of the securance can be maintained over the life of the building.

It is desirable to provide a new and improved electrical outlet box or flush mounted device box which allows such boxes to be installed in a wall construction and yet maintain the integrity of the wall construction.

It is desirable to provide a new and improved electrical outlet box which can provide a seal with the vapor barrier of an exterior wall or ceiling to maintain the integrity of the vapor barrier.

It is also desirable to provide a new and improved flush mounted device box which can provide a seal with the vapor barrier of an exterior wall or ceiling to maintain the integrity of the vapor barrier.

It is also desirable to provide a flange on all electrical outlet boxes and flush mounted device boxes which extends outwardly of the box and has upwardly facing and downwardly facing planar surfaces which are generally parallel to the bottom of the box.

It is desirable to provide a new and improved electrical outlet box and flush mounted device box which not only can be mounted in a manner to maintain the integrity of a vapor barrier in an exterior wall or ceiling of a building but which also accommodates any small inconsistencies in dimensions, alignment and the like allowing for fast and efficient construction and at the same time maintaining planar interior wall surfaces and desired siding construction.

It is desirable to provide a new and improved electrical outlet box and flush mounted device box having a flexible flange with upwardly facing and downwardly facing planar surfaces generally parallel to the box bottom which can be easily secured to the vapor barrier in exterior walls of a building to maintain the integrity thereof.

It is also desirable to provide a new and improved electrical outlet box and flush mounted device box which has a flange extending outwardly of the box in all directions with upwardly facing and downwardly facing planar surface generally parallel to the bottom of the box which is self supporting and yet flexible.

It is also desirable to provide a new and improved electrical outlet box and flush mounted device box having a flange extending outwardly thereof in all directions having top and bottom planar surfaces generally parallel with the bottom in which the flange is made of a plastic material adhesively secured to the box in a manner whereby the securance once made is maintained throughout the use of the box in the life of the building to which it is attached.

Finally, it is desirable to provide a new and improved method by which a flexible yet self supporting vapor barrier flange may be secured to existing electrical outlet boxes and flush mounted device boxes adhesively in a manner whereby the integrity of the securance can be maintained over the life of the building.

In the broader aspects there is provided a new and improved electrical utility box and flush mounted device box having a flange extending from the box in all directions and a method of adhesively securing the flange to existing boxes. The flange has an upwardly facing surface and a downwardly facing surface which are planar and generally parallel to the bottom of the box. The flange is self supporting and yet flexible enough to accommodate the dimensional and alignment irregularities in construction.

SUMMARY OF THE INVENTION

Consistent and consonant with the present invention, an electrical box assembly having the above desired characteristics, has surprisingly been discovered.

The electrical box assembly comprises: a box constructed of a first material and having a bottom, a side wall, and an open top, the box adapted to facilitate electrical connections therein and adapted for attachment to a building structure; and a flexible flange constructed of a second material and adhered to and extending outwardly from an outer surface of the side wall of the box, said flange spaced from the open top and adapted to be sealingly engaged with the building structure, the flange accommodating inconsistencies in the building structure and misalignment of the box with the building structure.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein.

DETAILED DESCRIPTION OF THE PREFERRED EMBODIMENTS

Figure 1:
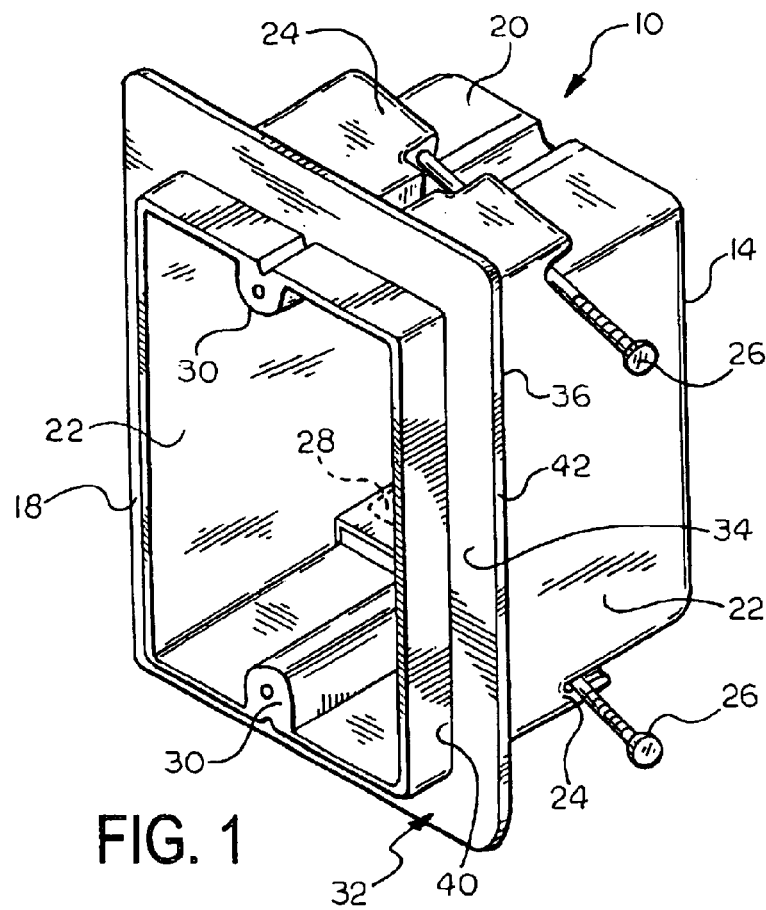
FIG. 1 is a perspective view of the new and improved electrical flush mounted device box of the invention.
Figure 2:
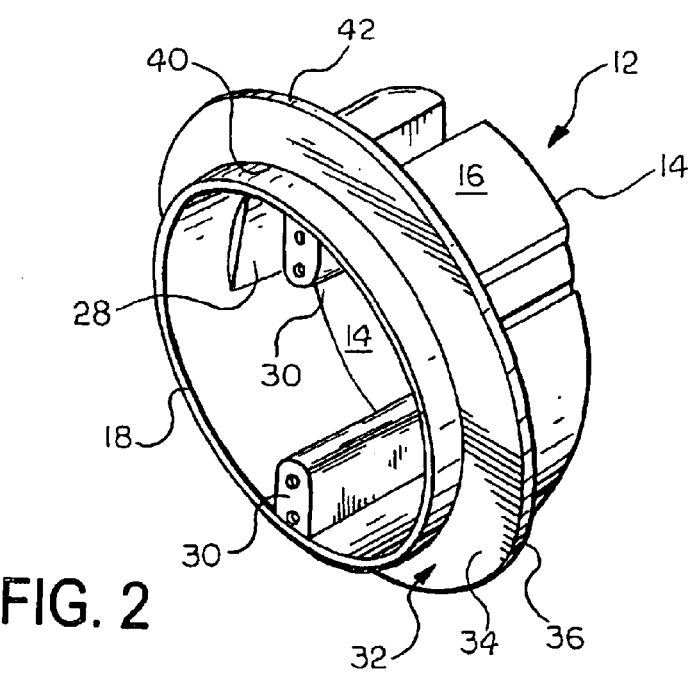
FIG. 2 is a perspective view of the new and improved outlet box of the invention.

The new and improved electrical boxes of the invention include outlet boxes and flush mounted device boxes. Referring to FIGS. 1 and 2, there is shown an electrical outlet box 12 of the invention and a flush mounted device box 10. The outlet box 12 and the flush mounted device box 10 include a back or bottom 14, upstanding sides 16 and an open front or top 18.

Box 10 is shown in FIG. 1 to be rectangular in shape having opposite ends 20 which are significantly shorter than the opposite sides 22. A single gang rectangular box is shown in FIG. 1. However, such boxes are also provided in a two gang box, a three gang box, and a four gang box with and without optional mounting brackets. Such boxes are also provided in a round box in which cross-sections parallel to the bottom 14 are circular.

The box 10 is adapted to be secured to a building structure by means including a securance flange 24 on the opposite ends 20 and a nail 26.

Within the box 10 are provided a plurality of knock outs 28 by which portions of ends 20 can be knocked out to pass cable through the sides to facilitate electrical connections within the box. Bosses 30 are also provided to extend into the box to provide connection for the electrical appliance mounted in the box and the top cover. The cover is not shown. A vapor barrier flange 32 extends outwardly from the upstanding sides 16 of the box in all directions. Flange 32 is spaced from top 18 and from bottom 14. Flange 32 has an upwardly facing surface 34 and a downwardly surface 36 both of which are planar and spaced apart and generally parallel to top 18 and bottom 14. Flange 32 has an inward edge 40 which is secured to the exterior of the upstanding side 16 of the box and a distal edge 42. Both the side walls of the box and the flange are relatively thin compared to the length and width of the side walls or the flange 32. Flange 32 is self supporting and resiliently flexible. In comparison with the flange 32, side walls 16 of box 10 are relatively rigid.

FIG. 2 illustrates a round outlet box 12. Outlet box 12 has much of the same structure as the flush mounted device box 10 shown in FIG. 1. Outlet box 12 is also available in various shapes and sizes, with and without nail brackets and with and without optional mounting brackets. Box 12, like box 10, has a bottom 14, upstanding sides 16, a top 18, knock outs 28, bosses 30, a flange 32.

Boxes 10, 12 can be provided in several different materials. These include, but are not limited to, steel, various moldable thermoplastics such as PVC, polycarbonate, polyphenylene oxide and fiberglass reinforced polyester. In accordance with the method of the invention, flange 32 is molded around the boxes 10, 12 and secured at inner edge 40, which defines an opening, to the exterior of the boxes 10, 12.

Figure 3:
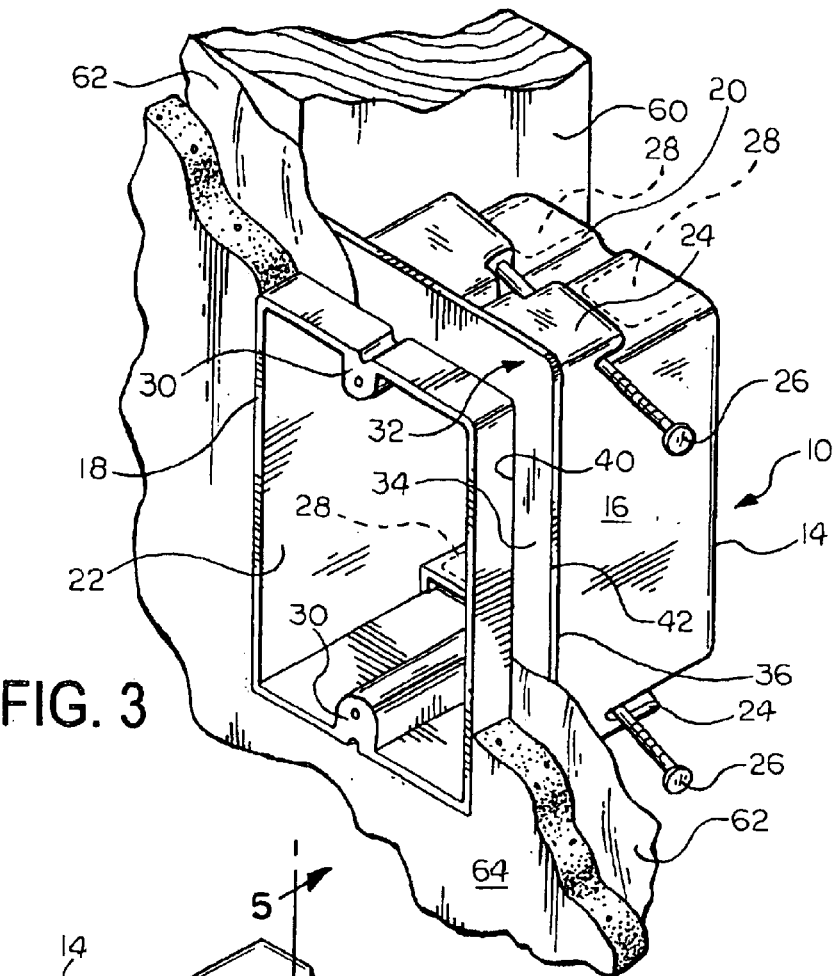
FIG. 3 is a perspective view showing the new and improved electrical flush mounted device box mounted to a stud in a building wall construction illustrating how electrical boxes of the invention maintain the integrity of the vapor barrier of an exterior wall construction.

Flange 32 must be of a material giving the flange 32 the capability of withstanding the handling of the boxes 10, 12 during both shipment and installation without becoming separated from the boxes 10, 12. Further, the flange 32 receives double sided tape or adhesive (not shown), for example, which may be activated to seal the flange 32 to a vapor barrier 62 of the building structure to which the boxes 10,12 are attached, as shown in FIG. 3. The flange 32 is resiliently flexible and self supporting. By the term "self supporting," as used in the specification herein and in the claims, it is meant that the flange 32 will appear as shown in FIGS. 1 and 2 in use and that when either box 10, 12 is placed on an upwardly facing planar surface, the flange 32 will support the box weight. Flange 32 is also resiliently flexible. By the term "resiliently flexible," as used herein, what is meant is that the flange 32 at any position thereof can be bent so as to position edge 42 on upstanding sides 16 and when released the flange 32 will reassume the position shown in FIGS. 1 and 2 at room temperature.

It is undesirable for the flange 32 material to crack, break or loosen from the boxes 10, 12 or take a set or become rigid or continue to cure when subjected to the elevated or reduced temperatures of rail cars or other transportation or during use. It is also undesirable for the flange material to crack, break or shatter when subject to impact at reduced temperatures. See the UL provisions with regard to non metallic boxes, U.L. 514c. It is also preferable that in order to establish production quantities that the flange 32 material be moldable in accordance with the method of the invention and that the material set relatively quickly and be capable of demolding in less than ten minutes.

In a specific embodiment, flange 32 is spaced from top 18 a distance to accommodate the interior wall material contemplated of using. For example, for boxes 10, 12 utilized with conventional drywall, the upwardly facing surface 34 of flange 32 is spaced from top 18 approximately 7/16 of an inch or 0.438 inches plus or minus 0.016. Additionally, the flange surfaces 34, 36 have a width sufficient to form an adequate seal with the vapor barrier of the building. In one embodiment, this width measures approximately 5/8 inch or 0.625 plus or minus 0.016 inches. In this same embodiment, the flange 32 thickness is approximately 1/10 of the width of the flange 32. Thus, the width to thickness ratio is approximately 10. Thus, in the embodiment mentioned above, the thickness is from about 0.063 inches to approximately 0.093 inches.

The material from which flange 32 can be made includes polyesters, polyurethanes, polyethers, polyamides, polyimides, polycarbonates, polyvinylchloride and combinations thereof. In one embodiment, the material from which flange 32 is produced is a polyurethane including a the combination of a polyol and an isocyanate. The two components are blended in accordance with a ratio of 100 parts of polyol to 30–45 parts of isocyanate, have a viscosity of 900 cp at temperature of 750 to 800° F. with a demold time of ten minutes.

Figure 4:
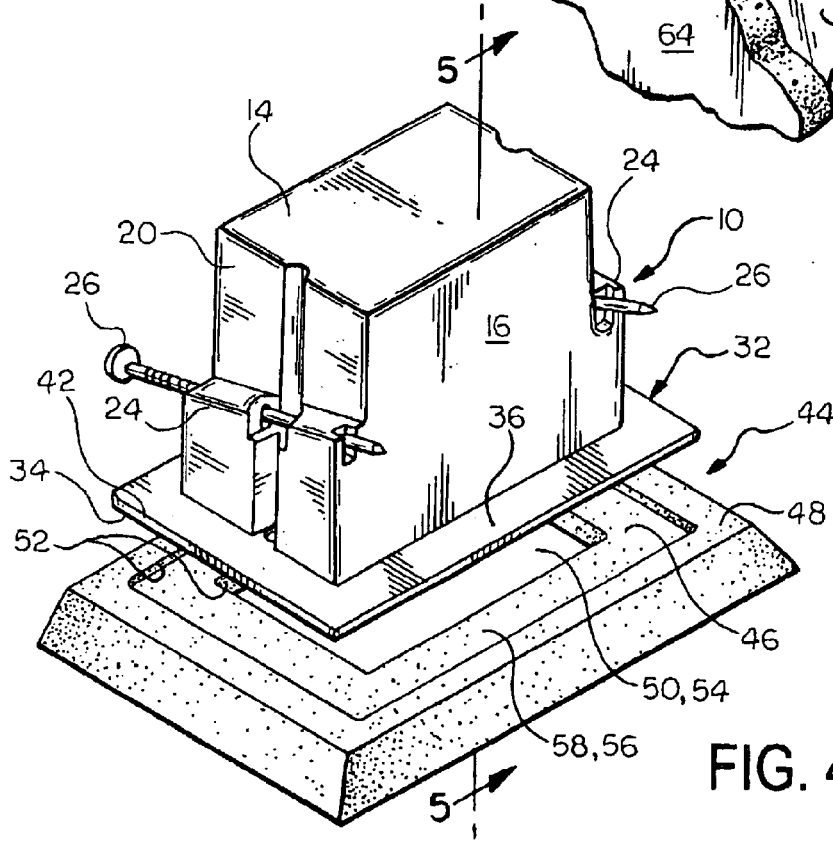
FIG. 4 is a perspective view showing the new and improved electrical flush mounted device box of the invention exploded from the mold of the invention.
Figure 5:
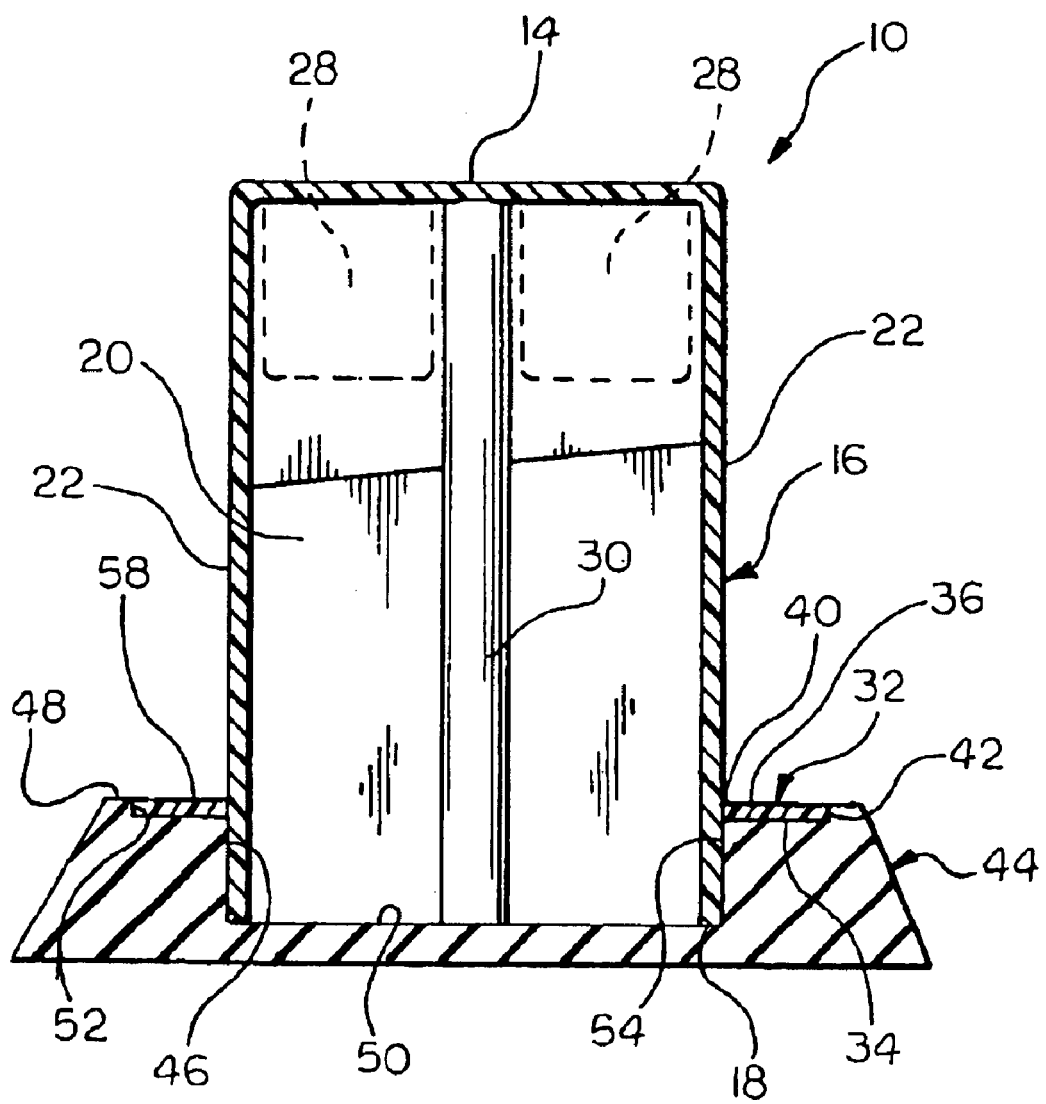
FIG. 5 is a cross-sectional view taken substantially along the section line 5—5 of FIG. 4, showing the flush mounted device box and mold sealingly connected to each other.

In accordance with the method of the invention, flange 32 is molded to the upstanding side 16 of the boxes 10, 12 in accordance with the method illustrated in FIGS. 4 and 5. This is accomplished in accordance with the method by providing a mold 44 of elastomeric material. Mold 44 has at least one cavity 46 therein. Mold 44 is self supporting and resiliently flexible. By the term "resiliently flexible," as it relates to mold 44, what is meant herein is that any position of the mold 44 if pressure is applied to the mold, the mold will resiliently compress and return essentially to its original shape. The mold cavity 46 extends downwardly from an upwardly facing surface 48. Mold cavity 46 has a bottom 50 and upstanding sides 52. Sides 52 are stepped thereby defining a smaller cavity portion 54 and a larger cavity portion 56, said smaller cavity portion 54 being adjacent to bottom 50, the larger cavity portion being adjacent to the upwardly facing surface 48. The stepped sides 52 have a step surface 58 between bottom 50 and upwardly facing surface 48 which faces upwardly as does surface 48 and is generally parallel to bottom 50 and upwardly facing surface 48.

Smaller cavity portion 54 is shaped to receive box 10, 12 adjacent top 18 in complementary fashion as shown in FIGS. 4 and 5. Box 10, 12 is received within smaller cavity 50 in a sealing relationship between side walls 52 and box sides 16. The box 10, 12 is not compressible or is dimensionally stable, the mold 44 of elastomeric material is compressible, and when box 10, 12 is placed in small cavity position 54, mold 44 expands against the side walls 16 to form a liquid tight seal therebetween. As best illustrated in FIG. 5, box 10, 12 defines with step surface 58 and side wall 52 of larger cavity portion 56 a cavity into which a hardenable, flowable resin material may be poured to form flange 32 and secure the same to the box 10, 12. The upwardly facing step surface 58 forms the upwardly surface 34 of flange 32. Side wall 52 of larger cavity portion 56 forms distal edge 42. Downwardly facing surface 36 of flange 32 is formed by the liquid molding material seeking its own level within the larger cavity portion 56.

Mold 44 may be provided with a plurality of cavities such as above described. Further, mold 44 may be provided with cavities for one gang boxes, two gang boxes, three gang boxes and four gang boxes of rectangular shape and of round boxes.

The elastomeric material from which mold 44 is manufactured must also have a release surface on bottom 50, sides 52, step surface 58 and preferably upwardly facing surface 48 which will not stick to the hardened resin material of the flange 32. Mold 44, in one embodiment, may be manufactured by molding the same from elastomeric materials. One such material is RTV silicone. Similar materials may be used.

In operation, the outlet boxes 12 and flush mounted device boxes 10 are secured to building structures as is conventional and used to enclose electrical devices and their connections to the electrical circuit of the building. As shown in FIG. 3, a flush mounted device box 10 is secured to a stud 60 by means of the mounting flanges 24 and nails 26 as is conventional. Overlaying the studs is the vapor barrier 62. Vapor barrier 62 is penetrated by the box 10 by an opening cut in the vapor barrier. However, the vapor barrier 62 is adhesively secured to the upwardly facing flange surface 34 by adhesive (not shown), thereby maintaining the integrity of the vapor barrier of the building. Overlaying the vapor barrier is a drywall sheet, plaster or other interior wall surface material 64. Interior wall surface material 64 overlays upwardly facing surface 34 and lies between flange 32 and top 18 of the box. The box cover encloses the box 10 and overlays a peripheral portion of interior wall material 64 adjacent box 10.

Flush mounted device boxes 12 penetrate the exterior sheathing of the building in much the same way as outlet boxes 10 penetrate the vapor barrier 62. Downwardly facing flange surface 36 may be adhesively secured to the sheathing. The siding overlays the upwardly facing flange surface 34 in much the same way as the interior wall surface material 64 overlays flange surface 34 in FIG. 3.

In both installation of the outlet box 12 and the flush mounted device box 10 above described, the vapor barrier 62 may be positioned between either the upwardly facing surface 34 and the interior wall material 64 as above described and illustrated in FIG. 3, or between the stud 60 and the downwardly facing flange surface 36 of the box 10, 12 as desired. Similarly, the exterior building sheathing may be positioned between the stud 60 and the downwardly facing surface 36 of the flange 32 or between the upwardly facing surface 34 of the flange 32 and the siding as desired. In each case, the flange 32 is adhesively secured to the vapor barrier 62 or to the exterior sheathing and thus, the appropriate surface 34, 36 of the flange 32 is provided with either adhesive or double sided tape.

The present invention provides a new and improved outlet box or flush mounted device box which allows such boxes to be installed in a wall construction and yet maintain the integrity of the wall construction. The new and improved outlet box or flush mounted box also provides a seal with the vapor barrier of an exterior wall or ceiling to maintain the integrity of the vapor barrier. The new and improved outlet box or flush mounted box has a flange on all electrical outlet boxes and flush mounted device boxes which extends outwardly of the box and has upwardly facing and downwardly facing planar surfaces which are generally parallel to the bottom of the box which not only can be mounted in a manner to maintain the integrity of a vapor barrier in an exterior wall or ceiling of a building but which also accommodates any small inconsistencies in dimensions, alignment and the like so as to allow for fast and efficient construction and at the same time maintain planar interior wall surfaces and desired siding construction. The new and improved electrical outlet box and flush mounted box also provides upwardly facing and downwardly facing planar surfaces generally parallel to the box bottom which can be easily secured to the vapor barrier in exterior walls of a building to maintain the integrity thereof.

The present invention provides a new and improved electrical outlet box and flush mounted device box which has a flange extending outwardly of the box in all directions with upwardly facing and downwardly facing planar surface generally parallel to the bottom of the box which are self supporting and yet resiliently flexible. The new and improved electrical outlet box and flush mounted device box provides a flange extending outwardly thereof in all directions having top and bottom planar surfaces generally parallel with the bottom in which the flange is made of a plastic material adhesively secured to the box.

The present invention also provides a new and improved method by which a flexible yet self supporting vapor barrier flange may be secured to existing electrical outlet boxes and flush mounted device boxes adhesively in which the flange is secured to the box in a manner whereby the integrity of the securance can be maintained over the life of the building.

While a specific embodiment of the invention has been shown and described herein for purposes of illustration, the protection afforded by any patent which may issue upon this application is not strictly limited to the disclosed embodiment; but rather extends to all structures and arrangement which fall fairly within the scope of the claims which are appended hereto.

What is claimed is:

1. An electrical box assembly comprising:

a molded dimensionally stable box structure formed of a rigid first material having a back with an interior surface and an exterior surface and a side wall with an interior surface and an exterior surface, side wall extending laterally from the back and terminating a predetermined distance from the back and defining exposed edges remote from the back, whereby the interior surfaces of the back and the side wall define an open front of said box facing outwardly from the back and the exterior surfaces of the side walls define an outer perimeter of said box; and a flange formed of a flexible generally flat second material having an interior surface and a spaced apart exterior surface, said flange having an opening defined by inner edges which are molded around the exterior surfaces of the side wall of said box to produce a weather-tight moisture resistant seal between the inner edges of the opening in said flange and the adjacent exterior surface of the side wall of said box and extending outwardly from the exterior surface of the side wall of the box and completely around the outer perimeter of said box, wherein said flange is spaced a distance from the exposed edges of the side walls of said box to accommodate a thickness of an associated wall board, the first material of said box being different from the second material of said flange.

2. An electrical box assembly comprising:

a molded dimensionally stable box structure formed of a rigid first material having a back with an interior surface and an exterior surface and a side wall with an interior surface and an exterior surface, the side wall extending laterally from the back and terminating a predetermined distance from the back and defining exposed edges remote from the back, whereby the interior surfaces of the back and the side wall define an open front of said box facing outwardly from the back and the exterior surfaces of the side walls define an outer perimeter of said box; and a flange formed of a resiliently flexible generally flat second material having an interior surface and a spaced apart exterior surface, said flange adhesively secured to and extending outwardly from the exterior surfaces of the side wall of said box to produce a moisture resistant seal between said flange and the adjacent exterior surface of the side walls of said box and extending completely around the outer perimeter of said box, wherein said flange is spaced a distance from the exposed edges of the side walls of said box to accommodate a thickness of an associated wall board, the first material of said box being different from the second material of said flange.

3. An electrical box assembly comprising:

a box constructed of a first material and having a bottom, a side wall extending laterally from the bottom and terminating a predetermined distance from the back, and an open top, said box adapted to facilitate electrical connections therein and adapted for attachment to a building structure; and a flexible flange constructed of a second material molded around and extending outwardly from an outer surface of the side wall of said box, said flange spaced towards the bottom from the open top and adapted to be sealingly engaged with the building structure, said flange accommodating inconsistencies in the building structure and misalignment of said box with the building structure, the first material of said box being different from the second material of said flange.

4. The electrical box according to claim 3, wherein the first material is one of steel, PVC, polycarbonate, polyphenylene oxide, fiberglass reinforced polyester.

5. The electrical box according to claim 3, wherein the second material is at least one of polyester, polyurethane, polyether, polyamide, polyimide, polycarbonate, polyvinylchloride, polyurethane.

6. The electrical box according to claim 3, wherein said box includes at least one fastener for attachment to the building structure.

7. The electrical box according to claim 3, wherein the side wall of said box has a circular cross section.

8. The electrical box according to claim 3, wherein the side wall of said box has a rectangular cross section.

9. The electrical box according to claim 3, wherein said flange is spaced a distance from the open top of said box to accommodate the thickness of an associated wall board.

* * * * *